Jan. 27, 1959 — T. W. PAUL — 2,870,940
SEEDING DEVICE
Filed Dec. 1, 1955
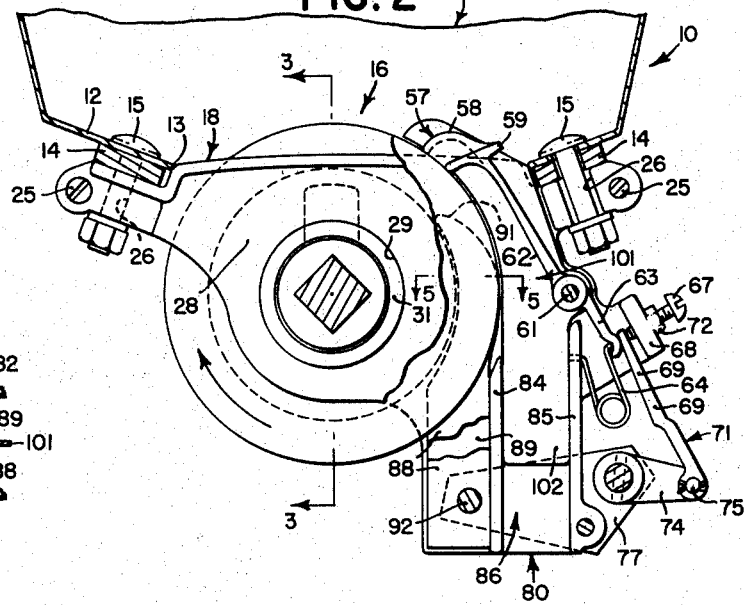
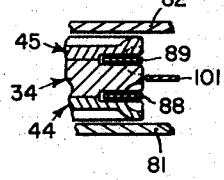
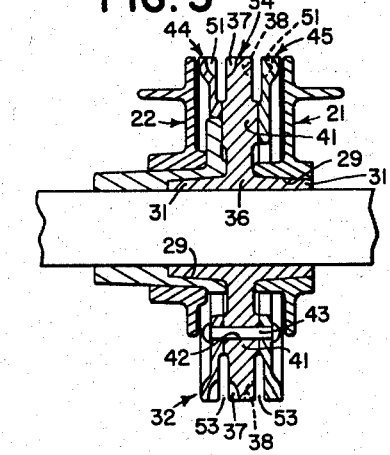
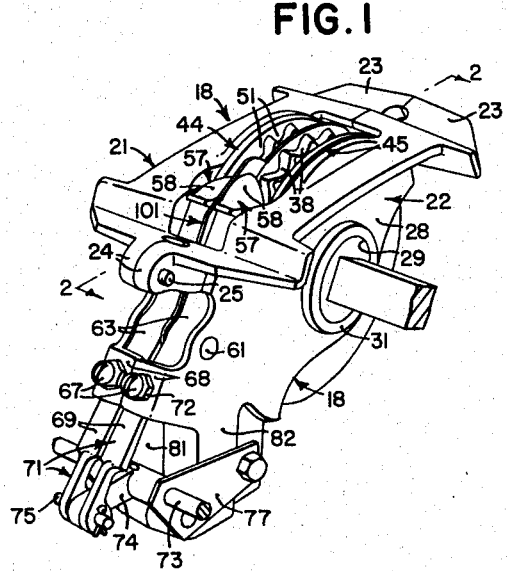
INVENTORS.
TALBERT W. PAUL
ATTORNEYS United States Patent Office 2,870,940
Patented Jan. 27, 1959

2,870,940

SEEDING DEVICE

Talbert W. Paul, Kansas City, Mo., assignor, by mesne assignments, to Deere & Company, a corporation of Delaware Application December 1, 1955, Serial No. 551,055

12 Claims. (Cl. 221—233)

The present invention relates generally to agricultural implement and more particularly to planting devices and the like.

The object and general nature of the present invention is the provision of a planting attachment particularly adapted to be used with the hopper of a grain drill. The attachments are preferably constructed and arranged to handle fairly large seed, such as peas, beans, and the like, whereas the conventional grain drill ordinarily handles the smaller seeds, such as wheat, barley, oats, etc. More specifically, it is a feature of this invention to provide a seeding device especially constructed to provide precision planting and single seed selection. A feature of this invention is the provision of a seed wheel of particular construction, having two sets of peripherally arranged seed cells, the wheel comprising three interconnected members, the laterally outer members having a peripheral set of half cells and the center member having two sets of peripherally arranged half cells, the cells being designed so that all of the members may be formed as castings, without requiring the use of any cores or the like, thus materially reducing the cost of manufacture.

A further feature of this invention is the provision of a seeding device having new and improved cut-off means, especially adapted for use with dual-celled seed wheels in which provision is made for individually adjusting the position of the cut-off means and, further, common means for adjusting all of said cut-off means simultaneously, utilizing for this purpose movable wedge means associated with each cut-off.

These and other objects and advantages of the present invention will be apparent to those skilled in the art after a consideration of the following detailed description, taken in conjunction with the accompanying drawings, in which:

Fig. 1 is a perspective view, with certain parts shown in section, illustrating a planting device in the nature of an attachment for grain drill hoppers or the like, in which the principles of the present invention have been incorporated.

Fig. 2 is a sectional view taken generally along the line 2—2 of Fig. 1.

Fig. 3 is an end view of the planting device, being a view taken generally along the line 3—3 of Fig. 2.

Fig. 4 is an enlarged fragmentary view showing the seed wheel construction.

Fig. 5 is a fragmentary sectional view taken generally along the line 5—5 of Fig. 2.

Referring now to the drawings, the grain drill to which the attachments of the present invention are adapted to be connected in lieu of the usual seed-selecting units, such as, for example, a fluted force-feed device, of the type shown in the patent to Erdman 2,400,745, is indicated by the reference numeral 10 and includes a transversely disposed, elongated seed box or hopper 11 having a bottom wall 12 with openings spaced along the bottom, as indicated by the reference numeral 13. Hopper frame means, including transverse bars 14, are apertured to receive attaching bolts 15 by which, as will be explained later, the various seeding devices 16 may be attached to the hopper bottom.

According to the principles of the present invention, each of the seeding attachments 16 includes a seed cup or housing 18 that is made up of two parts 21 and 22, preferably identical except that one is right-hand and the other left-hand, the parts 21 and 22 including forwardly and rearwardly extending sections 23 and 24 that are apertured to receive interconnecting means 25, such as a rivet, bolt, or the like, these extensions also being apertured generally vertically, as at 26, to receive the hopper-connecting bolts 15. Each housing 18 includes a pair of side wall sections 28 that are apertured, as at 29, to receive the hub sections 31 of a seed wheel 32. As best shown in Figs. 1 and 2, each seed wheel 32 comprises three members. The central member 34 is provided with an extended central section 36 that forms the hubs 31 mentioned above and a peripheral section that is formed with two axially spaced apart sets of half-cell recesses 37 and 38, preferably arranged in offset relation as shown in Fig. 3 and each having a flange extending radially outwardly beyond said recesses and formed with a generally cylindrical outer surface, the flange on said central member lying between the two associated sets of recesses. Radially inwardly of the sets of half-cells 37 and 38 the central wheel member 34 is provided with a flattened annular portion 41 that is apertured, as at 42, to receive rivets 43 or other fasteners by which two side members 44 and 45 are connected to the central member 34. The opposite faces of the annular portion 41 are flattened, as at 47, and the side members 44 and 45 have flattened sections that fit snugly thereagainst and are apertured to receive the fasteners 43, whereby the three members 34, 44, and 45 may rigidly and permanently be fixed together to serve as an integral seed wheel, the laterally inner portion of the peripheral section of each side member being formed with a set of half-cell recesses 51 complementary with respect to the associated cell recesses 37 and 38, respectively.

The peripheral portions of the three seed wheel members 34, 44, and 45 are shaped so that the wall portions of the cell recesses flare outwardly in a diverging manner, whereby the members 34, 44, and 45 may conveniently be formed in a casting operation without the use of any cores or the like. Contributing to this feature of the present invention is the formation of the cell sections of the seed wheel members so that there is a radial groove 53 lying between cooperating sets of the half-cell recesses 51, 37, and 38, as will be seen clearly from Fig. 3. Each half-cell section, 37 or 38, and the companion half-cell section 51, taken together, form a generally hemispherical seed pocket, each wheel 32 thus being provided with two axially spaced apart peripheral sets or series of seed-receiving pockets. The hub sections 31 of the wheel 32 are journaled in the side wall openings 29 of the associated housing, and the wheel 32 is of such diameter that the upper portion of the wheel extends into the interior of the hopper 11 through the associated bottom opening 13.

As the upper portions of the seed wheels 32, there being a plurality of seeding units as mentioned above, move through the seed in the hopper 11, a seed enters each seed cell, formed of two cooperating half-cell recesses, and is carried along by the rotation of the wheel, in the direction of the arrow indicated in Fig. 1. In order to prevent more than one seed from being carried along by a seed cell toward the ejecting and depositing means, a pair of cut-off levers 57 are provided, each being shaped at one end to form a laterally sloping seed-deflecting portion 58 and opposite the deflecting nose portions 58, the cut-off levers 57 have flattened portions 59 that overlie adjacent parts of the hopper-bottom openings. Each cut-off lever 57 is pivotally mounted on the housing 18 by means of a pivot pin 61 carried by suitable openings formed in the housing sections 21 and 22, and above the pivot 61 each cut-off lever 57 has a seed-deflecting section 62 that lies substantially directly opposite the associated seed ejector, which will be referred to below in detail. Desirably, the pivot pin 61 may be one of the bolts or rivets that hold the housing sections 21 and 22 together. Each cut-off lever 57 is also provided with a tail section 63, and a spring member 64, preferably of the torsion type, has one end anchored in an aperture in an adjacent portion of the housing while the other end is operatively connected with the tail portion 63 of the associated cut-off lever, whereby the spring 64 exerts a force tending to move the nose or deflecting section 58 toward the associated seed cells. Movement of the cut-off lever in this direction is limited by adjusting means in the form of a set screw 67 threaded into each of a pair of apertured lugs 68 carried by the housing and each having an inner end bearing against the wedge portion 69 of an associated second adjusting member 71. A lock nut 72 serves as means holding each set screw 67 in any particular position of adjustment. Since each seed wheel 32 is in the nature of a dual seed wheel, having two sets of seed cells, there are two cut-off levers 57 associated with each seed wheel, and also there is one adjusting screw 67 and associated parts for each cut-off lever 57. Each wedge member 71 is pivotally connected with an associated rockshaft 73 by means of an apertured arm 74 that is fixed to the rockshaft 73 and pivotally connected with each pair of wedge members 71 by a cross pin 75. The wedge members 71 are arranged in pairs for operative association with each pair of cut-off levers 57. To support the rockshaft 73, which extends lengthwise of the hopper 11, each seed wheel housing 18 carries an outwardly extending lug 77 that is apertured to rockably receive and support the shaft 73. At one end of the grain drill, the associated end of the rockshaft carries any suitable means for turning the shaft 73 to raise or lower the wedge members 71 relative to the associated cut-off levers 57 and the associated adjusting members 67. As will be seen from Fig. 2, when the shaft 73 is rocked in a direction to raise the cam members or wedge members 71, the nose portions 58 of all of the cut-off levers 57 are raised or moved away from the peripheral portion of the seed wheels 32, thereby arranging the seeding attachments to accommodate slightly larger seed. If it is desired, for example, to plant smaller seed, then the shaft 73 may be rocked in the other direction to move the several wedge members 71 in a withdrawing direction, thus permitting the springs 64 to force the upper ends of the cut-off levers toward the associated seed wheels. Operating any one of the adjusting members 67 serves to individually adjust the associated cut-off lever relative to the other levers. In this way, each cut-off lever may be individually adjusted so that all may be brought to substantially exactly the same relationship relative to the associated seed wheels, yet all of the cut-off levers may simultaneously be adjusted by operation of the rockshaft 73.

As will best be seen from Fig. 2, each of the seed wheel housings 18 is formed with a seed tube section 80, preferably formed by two half sections 81 and 82 carried by the sections 21 and 22, respectively, of the seed wheel housing. Registering end wall portions 84 and 85 act with the side wall sections to form a seed tube or passage 86 to receive seed as they are discharged from the seed wheel. In order to insure the proper discharge of the seeds from the seed cells, I provide a pair of ejecting plates 88 and 89 that extend generally vertical from the lower portion of the seed tube section 80, the upper portion of each of the ejecting plates 88 and 89 being rounded, as indicated at 91, and lie in the grooves 53, the upper or ejecting portions of the plates 88 and 89 being disposed just underneath the associated cut-off levers 57. The lower ends of the vertical cut-off plates 88 and 89 are apertured to receive one of the pins or bolts 92 that hold the housing sections together. One edge of each of the plates 88 and 89 is arranged to engage the associated wall portion 84 of the seed tube section so as to prevent rotation of the ejector plates 88 and 89 about the pin or bolt 92. It is to be noted that the ejecting plates 88 and 89 lie immediately below the cut-off levers 57, and as the result of this construction, the seeds are ejected from the seed cell practically immediately after they pass under the cut-off levers 57, the seed not being dragged around in sliding contact with any part of the enclosing housing, and thus are not damaged by abrasion or the like, as in other seed selecting devices with which I am familiar. By virtue of the angular disposition of the cut-off lever portion 62, any seed that is ejected by the upper portion of the associated ejecting plate, 88 or 89, will be deflected generally downwardly by the cut-off lever portion 62.

Disposed in the generally vertical plane between the planes of the two sets of seed cells, so as to act as a barrier or divider to prevent any accidental contact of the seed from one cell with the seed from an adjacent cell, is a stationary divider plate 101 that is located in a vertical plane lying between the two cut-off levers 57. The divider plate 101 includes a lower section 102 that extends into the seed passage 86 well below the point where the seeds are ejected from the seed cells by the ejecting plates 88 and 89. The divider means 101 thus serves to keep the seed from one cell from bouncing or being propelled against or colliding with the seed from an adjacent cell. This reduces rebounding and prevents any delay of the passage of the seed through the seed passageway 86.

The seed wheel construction of the present invention adequately provides for a dual planting function, if desired. For example, the seed wheel of the present invention may be mounted in a dual hopper, with the partition between the hopper section disposed in the plane of the central portion of the wheel, whereby one set of seed cells receives seed from one hopper and the other seed cells receive seed from the other hopper. In this case, suitable diverging seed discharge tubes may be provided, if necessary, and, in addition, it is not necessary to have the seed cells arranged in staggered relation as it is illustrated in Fig. 4.

While I have shown and described above the preferred structure in which the principles of the present invention have been incorporated, it is to be understood that my invention is not to be limited to the particular details shown and described above, but that, in fact, widely different means may be employed in the practice of the better aspects of my invention.

What I claim, therefore, and desire to secure by Letters Patent is:

1. A seed wheel for planters and the like, comprising a central wheel member and two side members, each in the form of a casting and each having a generally radially outwardly extending flange, the peripheral portion of the central member having two sets of half-cell recesses disposed alternately on opposite sides of the associated flange, the recesses of each set facing laterally outwardly and also generally radially outwardly alongside the associated flange, each of said side members having a set of half-cell recesses at one side of the associated flange and lying below the latter, said latter recesses facing generally radially outwardly and also facing generally laterally inwardly in registering alignment with the recesses of the adjacent set of half-cell recesses on the central member, each of said half-cell recesses having walls all of which flare laterally in a diverging manner, thereby facilitating the formation of said wheel members by casting without cores or the like, and means fixing said wheel members together.

2. A seed wheel as defined in claim 1, further characterized by each of said members having axially outwardly facing flattened surfaces constructed and arranged so as to lie in planes spaced from the adjacent portions of said recesses, whereby when the seed wheel members are fastened together a radially inwardly extending annular groove lies between adjacent sets of half-cell recesses, and a fixed ejecting plate lying in each of said grooves and each plate having an end portion disposed closely adjacent the bottom of the associated groove.

3. In a planting implement, seed-selecting means comprising a housing, a generally vertical seed wheel having seed cells and carried in said housing for rotation therein about a generally transverse axis, the vertical plane of rotation of said wheel extending in a fore-and-aft direction, said ejecting means disposed at the rear side of said seed wheel, the seed-ejecting means being arranged so that the seeds are ejected from the wheel at a point where a tangent to the wheel at said point extends substantially directly downwardly, and a generally vertical seed tube carried by said housing at the rear side of said wheel and receiving seed from said ejecting means.

4. The invention defined in claim 3, further characterized by seed cut-off means carried by said housing generally above said seed tube and generally above and rearwardly of said seed-ejecting means.

5. The invention defined in claim 3, further characterized by said ejecting means comprising a generally vertical plate extending from the lower portion of said seed tube upwardly into said seed cells, and means on the forward portion of the lower part of said seed tube to support said seed-ejecting plate.

6. The invention defined in claim 5, further characterized by said housing comprising two mating complementary sections, the latter having mating portions forming said seed tube, the latter portions being apertured, and said ejecting plate supporting means including means extending through said apertures for holding said complementary sections together.

7. The invention set forth in claim 6, further characterized by said seed-ejecting plate engaging at its rear edge a portion of said seed tube and thereby cooperating with said holding means to maintain said ejecting plate in position relative to said seed wheel.

8. In a planter, a housing, a celled seed wheel rotatably mounted in said housing, a cut-off lever pivotally mounted on said housing and having a seed-engaging portion movable toward and away from said seed wheel, and wedge means carried by said housing and engaging said lever to adjust the position of said seed-engaging portion relative to the cells of said seed wheel.

9. In a planter, a housing, a celled seed wheel rotatably mounted in said housing, a cut-off lever pivotally mounted at a mid-point on said housing and having a seed-engaging portion at one end movable toward and away from said seed wheel, and wedge means carried by said housing and engaging the other end of said lever to adjust the position of said seed-engaging portion relative to the cells of said seed wheel.

10. In a planter, a hopper having a bottom, a celled seed wheel rotatably mounted at the bottom of said hopper with an upper portion of the wheel extending into the bottom portion of the hopper, cut-off means carried by the hopper so as to engage the peripheral portion of the wheel substantially at the point where the peripheral portion of the wheel, during normal rotation thereof, leaves the hopper bottom, and seed ejecting means carried by the hopper in a position substantially directly below said cut-off means so as to eject seed from said cells substantially at a point on the seed wheel where a vertical line is tangent to the wheel.

11. The invention set forth in claim 10, further characterized by a portion of said cut-off means adjacent said ejecting means lying at an angle to the horizontal such that any seed leaving the seed wheel before reaching said tangential point will engage said cut-off portion and be deflected thereby generally downwardly.

12. In a planter, a hopper having a bottom, a celled seed wheel rotatably mounted at the bottom of said hopper with an upper portion of the wheel extending into the bottom portion of the hopper, cut-off means carried by the hopper so as to engage the peripheral portion of the wheel, and seed ejecting means disposed immediately below the cut-off means for ejecting the selected seed from said wheel, said cut-off means including a generally flat portion opposite said ejecting means and angled in a direction downwardly and away from said wheel so as to deflect any seeds striking said flat portion generally downwardly.

References Cited in the file of this patent

UNITED STATES PATENTS

| | | |
|---|---|---|
| 1,997,791 | Hoberg et al. | Apr. 16, 1935 |
| 2,440,846 | Cannon | May 4, 1948 |
| 2,605,023 | Ward | July 29, 1952 |
| 2,646,191 | Wechsler | July 21, 1953 |

UNITED STATES PATENT OFFICE
CERTIFICATE OF CORRECTION

Patent No. 2,870,940

January 27, 1959

Talbert W. Paul

It is hereby certified that error appears in the printed specification of the above numbered patent requiring correction and that the said Letters Patent should read as corrected below.

Column 5, line 16, for "said-ejecting" read -- seed-ejecting --.

Signed and sealed this 19th day of May 1959.

(SEAL)
Attest:
KARL H. AXLINE
Attesting Officer

ROBERT C. WATSON
Commissioner of Patents